United States Patent Office 3,250,404
Patented May 10, 1966

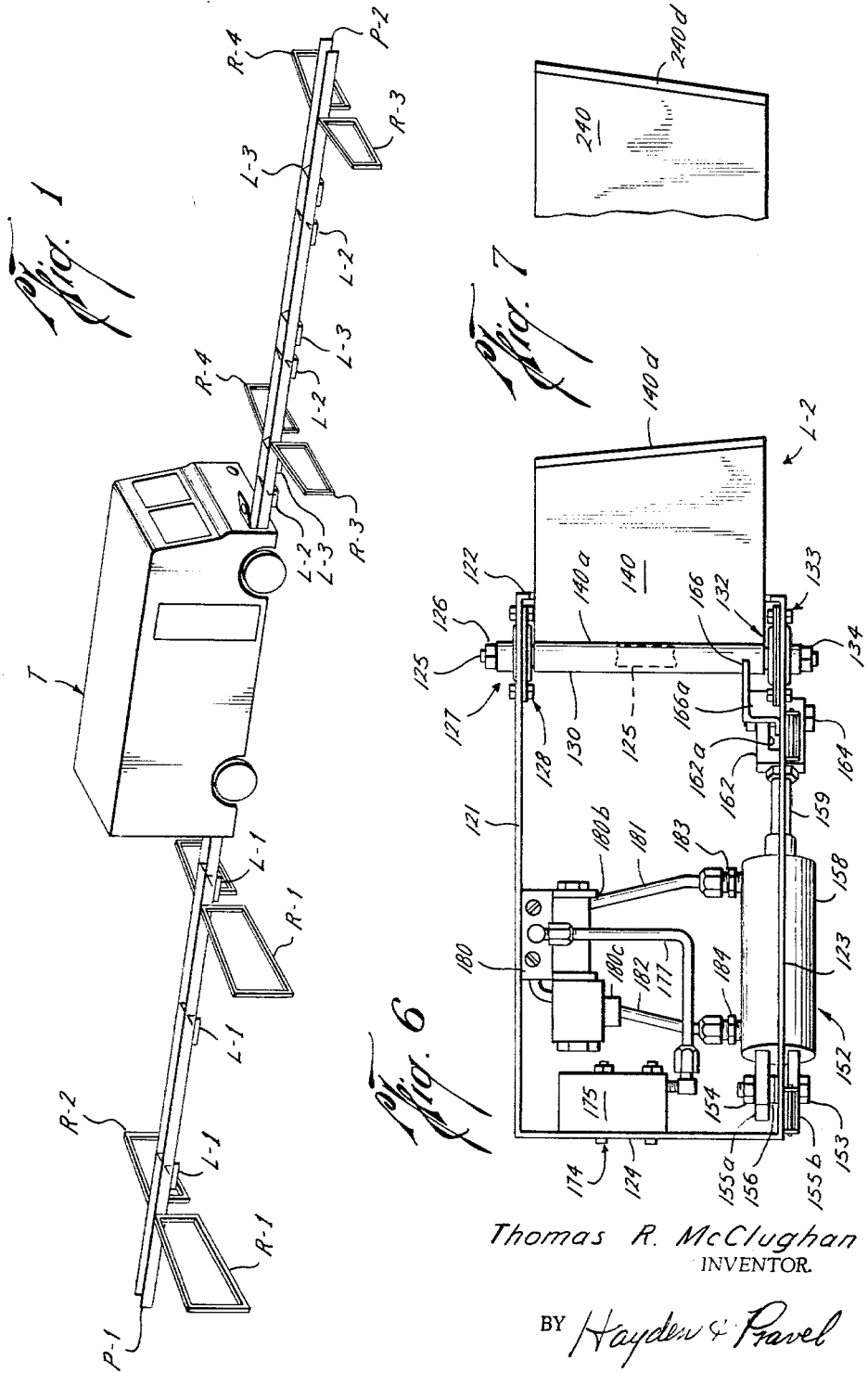

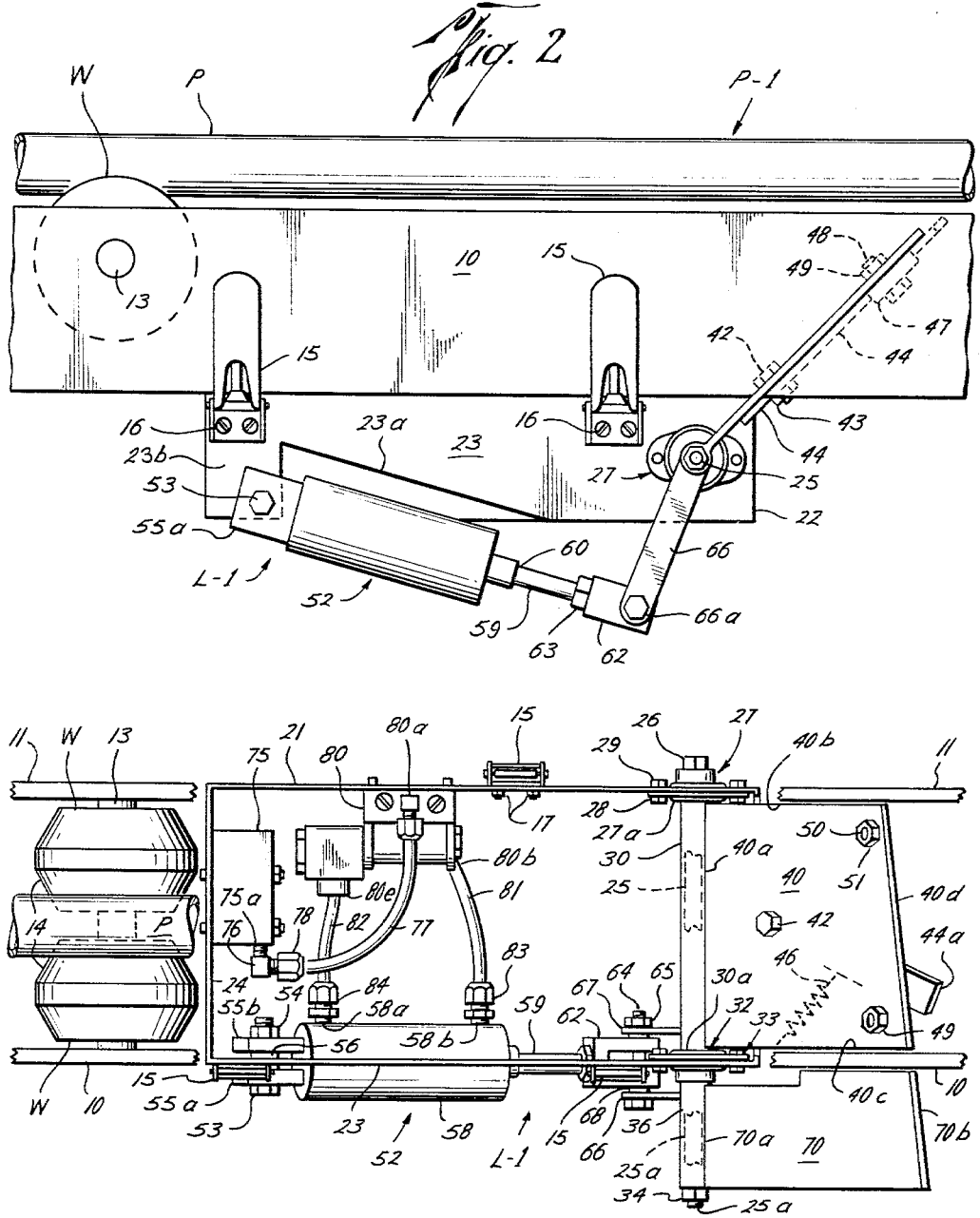

3,250,404
LOADING AND EJECTING MECHANISM
Thomas R. McClughan, Houston, Tex., assignor to Plastic Applicators, Inc., a corporation of Texas
Filed Apr. 20, 1964, Ser. No. 360,898
2 Claims. (Cl. 214—1)

This invention relates to a mechanism for loading, unloading, ejecting, the otherwise placing elongate objects on a platform from racks or other storage facilities adjacent the platform, and is particularly useful in placing cylindrical goods on a platform connected to a mobile inspection machine and removing said cylindrical goods from the platform after inspection in accordance with the operator's desire.

The handling of a large number of elongate objects by manual means is expensive and slow, particularly in field operations where equipment for handling a large group of similar objects is unavailable. This is definitely true in the case of handling pipe, tubing, or other tubular goods preparatory to inspection at remote sites such as oil wells. Tubular members placed in oil wells are often subjected to inspection for flaws to prevent the sometimes catastrophic results of failures during drilling operations. The inspection is often accomplished at or near the site of the well where the tubing is to be used so that a mobile inspection system is temporarily located at the site of the well to inspect the tubular members to be used in the well. For example, the mobile inspection system may be installed in a trailer or van which may be driven to the site of the well to inspect the drill pipe and tubing to be used in the well. The large number of sections of drill pipe and tubing used in an ordinary oil or gas well makes it imperative that mechanized means for delivering the tubular members to the inspection system be attached to the inspection system. This invention provides means for loading, unloading, or otherwise handling cylindrical goods at a remote location to be inspected.

Therefore, an object of this invention is to provide a new and improved loading mechanism for manipulating elongate objects on and off of a loading platform.

A further object of this invention is to provide a new and improved loading and unloading mechanism which places an object on a loading platform while simultaneously clearing the platform of any objects on the platform.

Another object of this invention is to provide a new and improved pipe handling mechanism which mechanically loads a selected number of pipes onto a pipe rack and ejects pipe on the rack to either side of the rack.

Still another object of this invention is to provide a new and improved loading device which may be positioned beneath a loading platform to lift a selected number of objects on the platform and displace them in a predetermined direction from the platform.

Yet another object of this invention is to provide a new and improved hydraulically operated pipe rack which positions pipe on the rack by lifting the pipe from an adjacent platform with a canted surface to roll the pipe across the canted surface to the pipe rack.

An important object of this invention is to provide a new and improved loading mechanism which lifts objects with an angular surface so the objects may roll across the surface and be positioned by a stop.

Still a further object of this invention is to provide a new and improved hydraulically operated loading mechanism which lifts objects to be loaded with a sloping surface brought into contact with the objects by a hydraulically powered crank connected to the sloping surface.

Other objects and advantages of the present invention will become readily apparent from a consideration of the following description and drawings wherein:

FIG. 1 is a perspective view of a van containing mobile inspection equipment with pipe racks and platforms deployed in front of and to the rear of the van for handling pipe to be inspected;

FIG. 2 is a side view of the loading device of this invention in the unactuated position beneath a platform having pipe thereon;

FIG. 3 is a top view of the loading device of this invention with the platform thereabove broken away to further illustrate details of the loading device;

FIG. 6 is a top view similar to FIG. 3 of the alternate embodiment of the loading device of this invention which is particularly adapted for ejecting pipe from a platform; and FIG. 7 is a view of an angular surface adapted to contact pipe on the platform wherein said angular surface may be used with the loading device of FIG. 6 to eject pipe from a platform to the opposite side of the platform.

Figure 4:
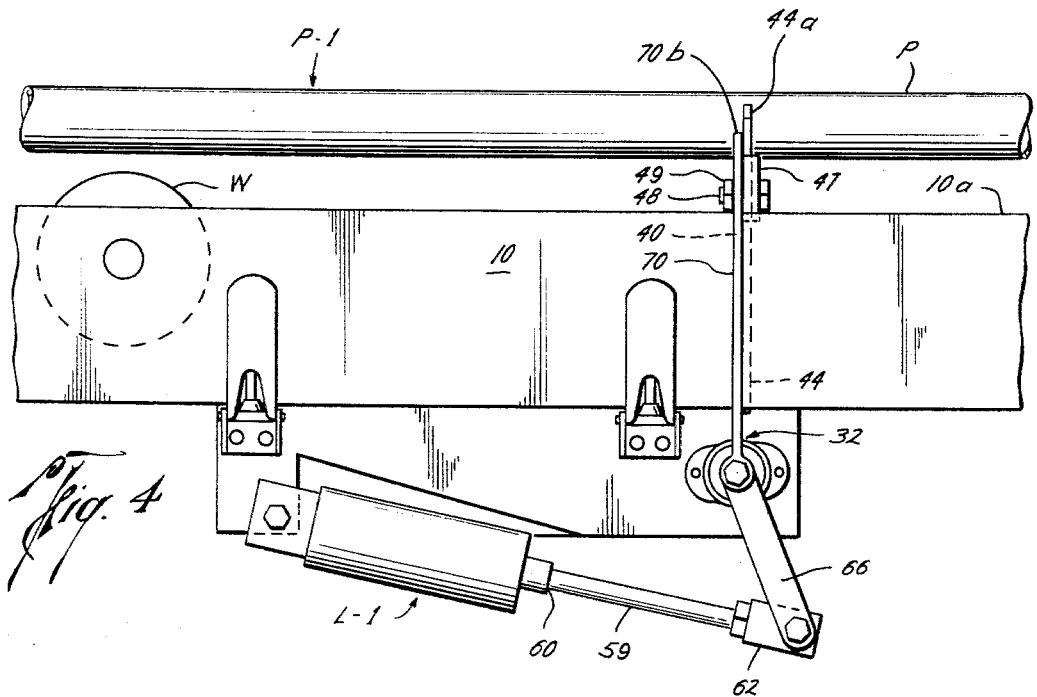
FIG. 4 is a view similar to FIG. 2 with the loading device in the actuated or vertical position relative to the platform and pipe placed thereon.

Considering the invention broadly in FIG. 1, the letter T generally designates a truck or trailer used for mobile inspection of pipe or other oil field tubular members and having such equipment contained therein. Pipe, tubing, or other elongate objects are place on a plurality of loading racks R–1 which slope toward a perpendicularly attached platform P–1. The platform P–1 is adapted to convey elongate objects to the truck T to be inspected by the equipment contained therein, and to this end, means are provided for moving the elongate objects on the platform P–1 axially toward the truck T. The goods, after inspection, may pass through the truck T to rest on the platform P–2 extending forwardly of the truck or, at the option of the operator, may be returned to the platform P–1. On return of the tubular goods to the platform P–1, a loading device L–1 mounted on the platform P–1 is actuated to eject pipe from the platform P–1 to rest on a plurality of racks R–2. With the same motion, the loading devices L–1 lift a predetermined number of tubular members from the racks R–1 and position the goods above the platform P–1. The loading devices L–1 are then operated to return to the quiescent condition which lowers the goods positioned above the platform P–1 onto the platform P–1 in position for continued operation and inspection. As previously mentioned, tubular members may be exited from the truck T to the platform P–2 whereupon they are ejected to the right or the left of the platform P–2 which serves as a means separating any number of tubular items into groups. Specifically, a plurality of the loading devices L–2 is positioned beneath the loading platform P–2 and they each have means constructed and arranged to lift pipe on the platform P–2 above the platform to roll from the platform onto the racks R–3. A plurality of loading devices L–3 is positioned beneath the platform P–2 to eject pipe from the platform P–2 to the opposite side onto a plurality of racks R–4 positioned on the opposite side of the loading platform P–2.

Considering the invention more in detail, in FIGS. 2 and 3, the loading platform P–1 has formed at two sides thereof parallel beams designated at 10 and 11, with the beam or plate 10 on the nearer edge as viewed in FIG. 2. The beams 10 and 11 may extend for any length necessary to support tubular members or other objects resting on the platform P–1 and are preferably formed of metal having a rectangular cross-section. A pipe P is positioned above the beams 10 and 11 on the platform P–1 near the upper edges 10a and 11a, respectively, thereof and rests on a plurality of wheels W, a pair of which is shown in FIG. 3. The pair of wheels W shown in FIG. 3 is placed on axle 13 which secures the wheels a predetermined distance from one another so that the angular or beveled surfaces 14 of the wheels W may cooperate together to receive pipe, tubular goods, and other cylindrical objects of various diameter thereon without requiring the relocation of the wheels W. The beveled surfaces 14 of the wheels W centralize pipe on the platform P–1 and the wheels W roll freely when the pipe P is moved longitudinally on the platform P–1.

The loader L–1 is secured to the beams 10 and 11 by use of a plurality of disconnectable latches designated generally at 15, it being understood that other suitable connecting means may be used to secure the loaders L–1 in the illustrated position. The latches 15 are preferably similar to trunk latches for ease of operation when the loading devices L–1 are attached or detached from the platform P–1. The latches 15 are secured to the loading device L–1 by means of bolts 16 which are engaged with nuts 17 or any other suitable means.

The loading device L–1 is assembled on a rectangular frame having four sides which are generally designated at 21, 22, 23, and 24. The sides 21 and 23 are positioned parallel and adjacent to the beams 11 and 10, respectively, of the platform P–1 while the sides 22 and 24 extend therebetween. An axle 25 is extended between the side plates 21 and 23 and through each of the side plates. The end of the axle 25 nearer the side 21 is engaged with a lock nut 26 which holds a bearing assembly designated generally at 27 on the axle 25. The bearing assembly 27 is fastened to the side brace 21 by extending bolts 28 through openings in the housing 27a of the bearing assembly designated generally at 27 and engaging the bolts 28 with nuts 29 on the opposite side of the brace 21. The bearing assembly 27 receives the open end of a sleeve 30 between the raceways to reduce friction between the axle 25 and the sleeve 30 placed thereabout when the sleeve 30 rotates relative to the axle 25. The sleeve 30 extends the full distance between the side braces 21 and 23 so that its opposite end 30a is also received between the bearing raceways of a bearing assembly designated generally at 32. The assembly 32 is also attached to the side brace 23 by nuts and bolts or other suitable means designated generally at 33. The axle 25 extends through the side frame member 23 and beyond, having a portion designated generally at 25a which is threadedly engaged with a lock nut 34.

A second sleeve 36, similar to the sleeve 30, is positioned on the portion 25a of the axle 25 and is likewise engaged at one end with the bearing assembly 32 which reduces friction on occurrence of rotation between the sleeve 36 and the axle 25. The sleeve 36 is preferably shorter than the sleeve 30 for reasons which will be more apparent hereinafter.

A plate 40 is attached at one edge 40a by welding or other suitable means to the sleeve 30 and extends between the frame members 10 and 11 of the platform P–1 with the edges 40b and 40c parallel to the frame members of the platform P–1 and extending from the edge 40a at the sleeve 30. The edge 40b of the plate 40 is somewhat shorter than the edge 40c so that an angular edge or surface 40d extends angularly between the frame members 10 and 11 of the platform P–1. The angular or canted surface 40d preferably slopes away from one of the side frame members of the platform P–1 as exemplified by the sloping surface extending away from the frame member 10 in FIG. 3.

A bolt 42 is placed in an opening in the central portion of the plate 40 and is engaged with a nut 43 at the opposite end. The bolt serves as the point of rotation for a metallic bar 44 which extends beyond the angular surface 40d to define a stop end 44a as viewed in FIG. 3. The bar 44 pivots about the bolt 42 and is drawn or urged toward the frame member 10 by a spring 46 which tends to rotate the bar 44 clockwise about the bolt 42 in FIG. 3. The bar 44 is limited in movement to the right by contact with a stop 47 which is mounted on a bolt 48 secured to the plate 40 by threaded engagement with a nut 49. The bar 44, when moved against the tension of the spring 46, is limited in movement by a similar arrangement wherein a bolt 50 is passed through a hole in the plate 40 and threadedly engaged with a nut 51 to secure a stop (not shown) adjacent the rear surface of the plate 40.

The side frame member 23 of the loading device L–1 is notched at 23a near one end of the frame member 23 to define an extension 23b of the frame member 23. The extension 23b provides a pivotal mounting for a hydraulic cylinder arrangement designated generally at 52. Specifically, a bolt 53 is passed through the extension 23b of the plate 23 and engaged by way of threads with a nut 54 at the opposite end. The hydraulic cylinder arrangement 52 is positioned so that a pair of identical mounting flanges 55a and 55b are flanked on each side of the extension 23b and held in position on the bolt 53 with a pair of washers 56 positioned on the shank of the bolt 53 to space the mounting flanges 55a and 55b away from the extension 23b. The mounting flanges 55a and 55b are connected to a cylinder 58 adapted to contain a piston which is connected to a piston rod 59 which slidably extends through an opening 60 in the cylinder 58. The cylinder 58 is double acting on admission of pressure fluid selectively to either end of the cylinder 58 through a pair of ports, the rear port being designated at 58a and the forward port being designated at 58b.

Piston rod 59 extends forwardly from the cylinder 58 and is engaged with a clevis 62 and is locked thereto by threadedly engaging a lock nut 63 on the shank of the piston rod 59 adjacent the clevis 62. The clevis 62 has an opening for receiving a bolt 64 therethrough which is locked by threaded engagement with a nut 65 and a lever arm 66 is engaged at its lower end 66a with the clevis assembly 62 and the bolt 64 for purposes to be explained. A similar lever arm 67 is likewise engaged with the bolt 64 and the clevis 62 at the opposite end of the bolt 64 and a washer 68 is placed adjacent each of the lever arms to prevent frictional binding between the lever arms and the clevis 62.

Each of the lever arms 66 and 67 extends upwardly from the clevis 62 and is attached by welding or other suitable means to the sleeves 36 and 30, respectively, so that the clevis 62 moves the sleeves on the axle 25 which serves as a fulcrum for rotation of the sleeves 30 and 36. It is to be noted that the sleeves 30 and 36, while free to rotate relative to one another, rotate in unison due to the fact that the lever arms 66 and 67 are both secured to the clevis assembly 62 which provides identical motion to the lever arms.

A plate 70 is connected at its edge 70a to the sleeve 36 which generally positions it exteriorly of the platform P–1 adjacent the frame member 10. The plate 70 is preferably parallel to the plate 40 and pivots therewith about the axle 25 when the clevis 62 moves the levers 66 and 67. The edge 70b of the plate 70 opposite the edge 70a is canted to form an angular edge or surface which is an extension of the angular edge or surface 40d of the plate 40, but for the gap existing therebetween and occupied by the frame member 10 of the platform P-1. The gap between the plates preferably is small relative to the diameter of tubular members to be loaded, unloaded, or otherwise manipulated by the loading platform P-1 for reasons which will be more apparent hereinafter.

Pressure fluid is supplied from a source (not shown) to the loading device L-1 through tubing or other suitable means preferably located beneath the platform P-1 and connected to a manifold 75 which is mounted on the cross member 24 of the loading device L-1. Pressure fluid in the manifold 75 egresses therefrom through a port 75a to which the elbow 76 is threadedly engaged. A tubing 77 is engaged with the elbow 76 and locked thereto in a pressure tight seal by a nut 78. Tubing 77 supplies pressure fluid therethrough to the inlet port 80a of a solenoid valve 80 mounted on the side frame member 21 of the loading device L-1. The solenoid valve 80 is of conventional construction whereby operation of an electrical switch applies power to the solenoid valve to open ports therein to control the flow of pressure fluid therethrough to one of the two exhaust ports provided thereon. The exhaust ports 80b and 80c are connected to suitable tubing means such as the tubing 81 and 82, respectively, there being fittings 83 and 84, respectively, connecting the tubing means to the hydraulic cylinder arrangement designated generally at 52. More specifically, the fitting 83 is engaged with the port 58b of the cylinder 58 in a pressure tight engagement to supply pressure fluid to the forward end of the cylinder 58 to act on the piston therein and to force the piston towards the rear of the cylinder. Conversely, the fitting 84 is connected in a leak proof connection to the port 58a whereby pressure fluid may be admitted to the cylinder 58 to act on the rearward face of the piston therein to force or urge the piston longitudinally of the cylinder 58 to extend the piston rod 59 therebeyond.

Figure 5:
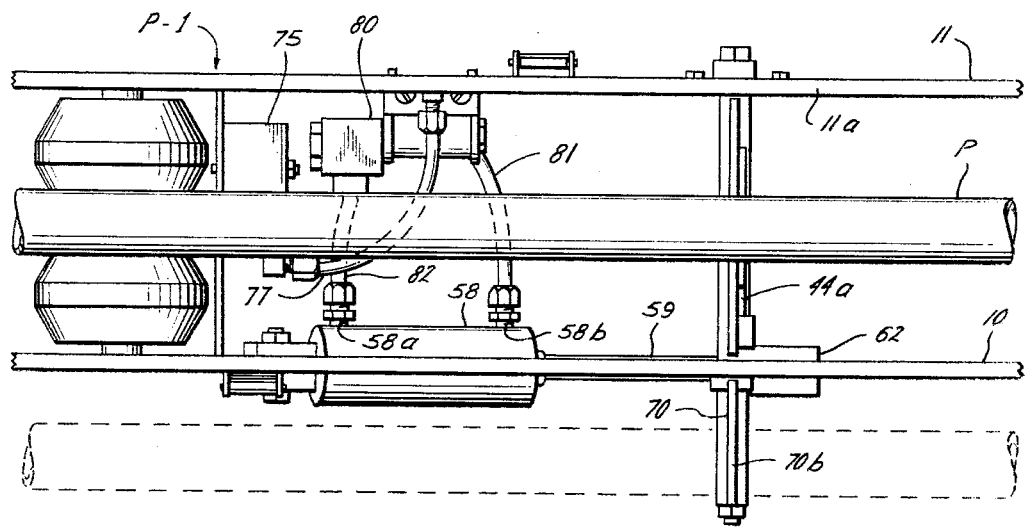
FIG. 5 is a top view similar to FIG. 3 with the loading device in the actuated position to engage pipe on the platform.

Attention is directed to FIGS. 4 and 5 wherein the loading device L-1 is illustrated in an operated position resulting from admission of pressure fluid to the cylinder 58 extending the piston rod 59 therefrom. On operation of the solenoid valve 80, pressure fluid flows from the manifold 75 through the tubing 77 and into the solenoid valve 80 and thence to the cylinder 58 through the tubing 82. The admission of pressure fluid through the port 58a urges the piston rod 59 and the attached clevis 62 below and beyond the axle 25. Movement of the clevis assembly 62 rotates the lower end of the lever arms 66 and 67 about the axle 25 acting as a fulcrum and rotates the sleeves 30 and 36 which are rigidly attached to the lever arms. Such rotation of the sleeves 30 and 36 lifts or raises the angular surfaces 40d and 70b of the attached plates 40 and 70, respectively, upward relative to the loading platform P-1 to extend above the top edges 10a and 11a of the side frame members 10 and 11 of the loading platform. In particular, the plate 40, when erected vertically above the axle 25 extends substantially above the platform P-1 to contact objects thereon with the angular surface 40d. Simultaneous actuation of a plurality of the loading devices L-1 positioned beneath the platform P-1 contacts and lifts the pipe P above the wheels W of the platform P-1 as more clearly illustrated in FIG. 4. As illustrated in FIG. 4, the pipe P rests on the angular surface 40b and rolls toward the nether side thereof.

The plate 70 is erected simultaneously with the plate 40 exteriorly of the platform P-1 immediately adjacent the side frame member 10 thereof. As may be seen in FIG. 1, the external location of the plate 70 places it beneath the pipe on the racks R-1 which is more clearly shown with the dotted line representation of a pipe in FIG. 5. On actuation of a plurality of loading devices L-1, the erection of the plates 70 contacts the plates 70 against a preselected pipe on the racks R-1 adjacent the loading platform P-1 and lifts said pipe above the racks on the angular surface 70b. The pipe lifted above the racks R-1 rolls toward the platform P-1 because the canted surfaces 70b are generally sloped toward the platform P-1. It is to be noted that the pipe P on the platform P-1 is not contacted by the stop end 44a of the bar 44, but rather, the motion of the pipe P does not affect the stop 44a. The stop 44a, which is spring loaded toward the higher end of the erected plate 40, prevents pipe from rolling completely across both plates 70 and 40 when the loading devices L-1 are operated to stop the pipe lifted from the racks R-1.

FIGS. 4 and 5 show the stop 44a extending above the plate 40 and away from the pipe P resting thereon. The stop 44a remains in this posture until the pipe lifted by the angular surfaces 70b rolls thereacross and onto the angular surface 40b to contact the stop 44a. Since the bar 44 is pivoted at its lower end, pipe rolling across the upper surface 40b of the plate 40 moves the stop 44a across the upper surface of the plate 40 and into contact with the bolt 50 positioned near the lower end of the inclined surfaces 40b. It is to be noted that such movement of the bar 44 extends the spring return 46 which returns the stop 44a to the quiescent position when the plate 40 is lowered to disengage the stop from the pipe.

The solenoid valve 80 is actuated to return the lifting mechanism L-1 to an inoperative position by admitting pressure fluid to the tubing 81 and the port 58b of the cylinder 58. Pressure fluid admitted to the forward end of the cylinder 58 acts on the piston to urge the piston toward the rearward end of the cylinder 58 to consequently draw the piston rod 59 and the attached clevis 62 toward the cylinder 58. The lever arms 66 and 67 are pivoted about the shaft 25 and impart clockwise rotation to the sleeves 30 and 36 about the shaft 25 to carry the plates 40 and 70 below the upper edge 10a of the frame member 10 to a position similar to the illustration of FIG. 2. The pipe P resting on the angular surface 40d of the lifting device L-1 is lowered to contact the wheels W whereupon the beveled surfaces 14 of the wheels W center the pipe P on the platform P-1.

The platform P-2 is similar in construction to the platform P-1 and is supported by the racks R-3 and R-4 connected thereto by any suitable means and positioned on each side thereof. As previously mentioned, the loading devices L-2 and L-3 are similar to the loading devices L-1 and differ from one another only in construction altering the direction of ejection of pipe on the platform P-2. FIG. 6 illustrates that the loading device L-2 is formed of a rectangular framework and has sides designated 121, 122, 123, and 124, the sides 121 and 123 being secured longitudinally to the side frame members of the platform P-2 and frame members 122 and 124 lending structural strength as cross members positioned between the sides 121 and 123. A shaft or axle 125 is extended between the frame members 121 and 123 and is threadedly engaged with lock nuts 126 and 134 at each end. A sleeve 130 is placed about the shaft 125 and extends between the side frame members 121 and 123 of the loading device L-2 with the ends of the sleeve 130 encompassed by the raceways of a pair of ball bearing assemblies designated 127 at the frame member 121 and ball bearing assembly designated 132 at the frame member 123. The friction reducing means 127 is attached to the frame member 121 by any suitable means such as nuts and bolts designated generally at 128. Likewise, the bearing assembly 132 is secured to the framework of loading device by means such as nuts and bolts designated at 133.

The sleeve 130 is welded or otherwise attached to one edge 140a of a plate 140. The plate 140 has an angular or canted surface 140d which slopes toward one side of the platform P-2 when the loading device L-2 is installed thereunder and is similar to the plate 40.

A hydraulic piston and cylinder arrangement designated generally at 152 operates similar to the hydraulic arrangement designated generally at 52 in FIG. 3 and is secured to a bolt 153 by connecting the bolt 153 to a pair of extending flanges 155a and 155b. Washers 156 are placed between the flanges 155a and 155b and the side frame member 123 and a nut 154 is threadedly engaged with the end of the bolt 153 to secure the hydraulic assembly 152 to the loading device L-2.

The hydraulic assembly 152 is comprised of the hydraulic cylinder 158 and includes a piston rod 159 and a clevis assembly 162 connected to the extended end of the piston rod 159. A bolt 164 is received through openings in the clevis assembly 162 and is rotatably engaged with the lower end of a lever arm 166. The lever arm is rigidly connected to the sleeve 130 by welding or other suitable means and extends therebelow towards the clevis assembly 162. Alignment between the lever arm 166 and the clevis assembly 162 is achieved by means of an offset 166a in the lever 166 which positions the lower end of the lever 166 within the yoke 162a of the clevis assembly 162 for engagement with the bolt 164.

Fluid is conducted by suitable means along the length of the platform P-2 and is distributed to the loading devices L-2 where such fluid is received in a manifold 175 associated with each of the loading devices L-2. The manifold 175 is mounted or secured by nuts or bolts designated generally at 174 or any other suitable means to the frame member 124. Pressure fluid admitted to the manifold 175 is delivered to a solenoid valve 180 by means such as the tubing 177 connected therebetween. The solenoid valve 180 operates in response to movement of an electrical signal which operates ports within the valve to distribute pressure fluid to one of the two outlet valves as is well known to those skilled in the art. The outlet ports of the solenoid valve 180 are designated generally at 180b and 180c, and they are connected to conduits 181 and 182, respectively. The conduits 181 and 182 are connected to ports positioned at the opposite ends of the cylinder 158 by fittings designated 183 and 184, respectively. As previously mentioned, the solenoid valve 180 is actuated to admit the fluid to a selected end of the cylinder 158 to extend or retract the piston rod 159 and rotate the lever arm 166 about the sleeve and axle.

When pressure fluid is applied to the piston in the cylinder 158 through the rear port 184, such pressure fluid urges the piston in the cylinder 158 toward the forward end of the cylinder and extends the piston rod 159 toward and below the shaft 125 to effect rotation of the sleeve 130 through the coupling of such motion by the lever 166 and the clevis 162. The plate 140 is rotated with the sleeve 130 about the axle 125 to the vertical position which is best exemplified by the FIGS. 4 and 5 of the loading device L-1. Those skilled in the art will recognize the fact that the loading device L-2 not only moves to the actuated position exemplified in FIGS. 4 and 5, but also that the loading device L-2 is returned to the unactuated position in a manner similar to the loading device L-1.

The loading devices L-3 attached to the platform P-2 are identical to the loading devices L-2 except that the canted or angular surface of the loading devices L-3 slopes in the opposite direction when compared with the devices L-2 to eject tubular members from the platform P-2 to the opposite side thereof. FIG. 7 illustrates the angular surface 240d of the plate 240 which plate may be substituted for the plate 140 of the loading device L-2 to form the loading device L-3.

In operation, the platform P-1 is connected to the racks R-1 and R-2 and is also connected to the rear of the truck T. The racks R-1 are loaded with pipes, tubing, or other similar items to be inspected in the truck T and such tubular members are rolled toward the platform P-1 by the sloping upper surface of the racks R-1. Of course, the tubular members on the racks R-1 are fed toward the platform P-1 throughout operations of the truck T and manipulations of pipe on and off the platform P-1.

Assume, for purposes of illustration only, that several sections of pipe are resting on the racks R-1 and that no pipe is positioned on the platform P-1. The slope of the racks R-1 urges the pipe towards the side frame member 10 of the platform P-1, and one such pipe rests above the plate 70 of the loading device L-1. The solenoid valve 80 of each of the loading devices L-1 is actuated to admit pressure fluid to the rear of the cylinder 58, it being recalled that the loading device L-1 is in the quiescent position illustrated in FIGS. 2 and 3. The piston rod 59 is extended through the opening 60 of the hydraulic assembly 52 and the clevis 62 is carried toward and beneath the axle 25. Such movement of the clevis 62 pivots the lever arms 66 and 67 about the shaft 25 to rotate the sleeves 30 and 36 about the shaft to erect the plates 40 and 70 to the vertical position.

The plate 70 extends upward above the top edge 10a of the side frame member 10 and is brought into contact with the tubular member resting on the racks R-1 nearest the platform P-1. The movement and full erection of the plate 70 lifts the nearest pipe on the rack R-1 above the level of the platform P-1 on the angular surface 70b of the plate 70. The pipe which is lifted above the racks R-1 rolls across the angular surface 70b toward the platform P-1. While a small gap exists between plates 40 and 70 to permit the plates to operate on both sides of the side frame member 10, such gap is preferably narrow relative to the diameter of the pipe rolled thereacross so that the gap between the plates does not interfere with the ability of the pipe to roll across the angular surfaces 70b and 40d. The pipe P continues to roll to contact the stop member 44a which is urged in the counterclockwise direction as viewed in FIG. 3. The stop 44a rotates about the bolt 42 with continuous counterclockwise rotation until the stop 44a is arrested by the bolt 50 to halt the downgrade movement of the pipe on the angular surface 40d. The plates 40 and 70 may remain in the vertical position illustrated in FIGS. 4 and 5 for an indefinite period until the solenoid 80 of the loading device L-1 is actuated to lower the pipe held above loading platform P-1.

Pressure fluid is admitted to the forward port 58b of the cylinder 58 by action of the solenoid valve 80 to retract the piston rod 59 from the extended position to swing the plates 40 and 70 in a clockwise direction below the level of the top edges 10a and 11a of the side frame members 10 and 11, respectively, of the loading platform P-1. The pipe P is lowered to contact the wheels W which centralize the pipe resting thereon between the beveled edges 14 of the wheels W. When the plate 40 is lowered and freed of contact with the pipe P, the spring 46 pulls the bar 44 and the stop 44a into contact with the rest 47 to reset the stop 44a for further use. Also, when the plate 70 is lowered below the plane established by the top edges of the racks R-1, pipe remaining on the racks R-1 rolls toward the platform P-1 to position one section of pipe adjacent the side frame member 10 of the platform P-1 where such pipe is positioned to be lifted onto the platform P-1 during the next operation of loading devices L-1.

The pipe P on the platform P-1 is moved longitudinally of the platform P-1 and into the truck T for inspection. In accordance with the desires of the operator of the inspection equipment, the pipe P is positioned on either of the loading platforms P-1 or P-2 after inspection, and the inspected pipe may be removed from the loading platform by ejection with the appropriate loading devices.

Assuming that the pipe P rests on the platform P-1 after inspection and, assuming further, that the operator of the equipment desires to inspect the next pipe resting on the racks R-1, the loading devices L-1 are actuated to simultaneously eject the pipe P on the platform P-1 to the racks R-2 and to also lift the next section of pipe on the racks R-1 and place said pipe on the platform P-1. Specifically, the solenoid valve 80 is actuated to flow pressure fluid from the manifold 75 to the rear port 58a of the cylinder 58 where such pressure fluid is admitted to the chamber of the cylinder to act on the piston positioned therein. The pressure fluid moves the piston within the cylinder and the piston rod 59 and the clevis 62 are consequently extended to the illustrated positions of FIGS. 4 and 5. Such movement of the clevis 62 operates the lever arms 66 and 67 to rotate the sleeves 30 and 36 about the shaft 25 to raise the plates 40 and 70 to the vertical position shown in FIG. 4. Considering the plate 40 only, the pipe P resting thereon is lifted on the canted or angular surface 40d which contacts the pipe P downslope or below the stop 44a. The pipe P rolls across the surface 40d and off the edge of the plate 40 onto the sloping racks R-2. The pipe P continues to roll across the racks R-2 and is collected thereon with other pipe in accordance with the desires of the operator of the inspection equipment.

Considering the operation of the plate 70 when said plate is erected to the vertical position illustrated in FIG. 4, the lowermost pipe on the racks R-1 is lifted thereabove on the angular edge of the plates 70 and rolls thereacross to contact the plate 40. As previously mentioned, the gap between the plates 40 and 70 is small relative to the diameter of the pipe rolling thereacross so that the pipe may not stall or catch on the sharp corners of the plates but rather will roll into contact with the stop 44a. The pipe urges the stop 44a across the upper surface of the plate 40 for the full range of its motion and is arrested by the stop 44a when said stop is limited in excursion. It is to be noted that the stop 44a prevents the pipe from rolling completely across the platform P-1 from the adjacent rack R-1 to the rack R-2, regardless of the period of time which the loading device L-1 is held in the operated position with the plates 40 and 70 held to provide an inclined place for such rolling.

The operator of the inspection equipment in the truck T may also desire to transfer pipe from the racks R-1 to the platform P-1 and through the truck T to rest on the platform P-2. At such juncture, the operator has the choice of ejecting pipe on the platform P-2 onto either of the racks R-3 or R-4, perhaps in accordance with the indications of the inspection equipment in the truck T. In any event, the loading devices L-2 may be operated to eject pipe from the platform P-2 onto the racks R-3 through operations similar to the operation of the loading devices L-1.

Each of the loading devices L-2 is actuated by application of pressure fluid through the intake manifold 175 and thence to the solenoid 180 where said solenoid valve routes pressure fluid through the conductor or conduit 182 to the connected cylinder 158. The cylinder 158 is filled with pressure fluid to urge the piston contained therein toward the limit of its travel to extend the piston rod 159 therefrom, causing rotation of the sleeve 130 about the axle or shaft 125. Such rotation of the sleeve 130 lifts the angular end of the plate 140 through the opening between the side frame members of the loading platform P-2 to contact the pipe resting thereon and to lift such pipe above the level of the platform P-2 so that the pipe is free of contact with the platform P-2. Since the pipe is in contact with only the sloping surface, the pipe is urged toward the lower end of the sloping surface and rolls across the plate 140 and off such plate onto the loading racks R-3 where the pipe is collected with other pipe in accordance with the desires of the operator of the inspection equipment in the truck T.

The loading devices L-3 eject pipe from the platform P-2 to the side of the platform P-2 opposite the side to which pipe is ejected by the loading devices L-2 and onto the loading racks R-4. As previously mentioned, the loading device L-3 is similar to the loading device L-2 with the exception of the plates attached to the sleeve 130 which impart opposite handedness thereto. Since the plate 240 shown in FIG. 7 may be substituted for the plate 140 shown in FIG. 6 to convert the loading device L-2 into the loading device L-3, operation of the loading device L-2 is similar to the operation of the loading device L-3 for which a detailed example of operation is believed unnecessary.

Certain alterations may be incorporated in the invention without departing from the spirit thereof. As an example, the platforms P-1 and P-2 illustrated in FIG. 1 are not limited to narrow elongated platforms particularly adapted to handle tubular members and other such goods. The platforms may be adapted to handle objects having a rectangular or square cross-section and which rests on one side or face by rolling such objects across a plurality of small wheels mounted on axles to form the upper surface of the platform P-1. Thus, objects having a flat side may contact the plurality of wheels forming the upper surface of the platform P-1 and slide across in a manner similar to the movement of pipe positioned on the preferred embodiment shown in the drawings. The handling of objects with flat sides or surfaces will be further facilitated by mounting or positioning small circular members along the angular surfaces or edges 40d, 70b, 140d, and 240d to facilitate downslope movement. If such means were installed on the plates of the lifting devices, the lifted object would not roll or rotate as it transverses the width of the loading platform, but the objects with the flat sides would slide across and above the platform on the roller means positioned in the edge of the lifting plates 40, 70, 140, and 240.

Those skilled in the art may adapt alternative means to lift the angular surfaces of the loading devices above the level of the loading platform using a motion other than the rotary motion of the preferred embodiment. For instance, hydraulic means may be adapted to lift the plate 40 above the platform P-1 without rotation in which instance the plate 40 would be at all times vertical with respect to the platform P-1. This could be achieved positioning the plate 40 in a pair of vertically extending tracks and placing a hydraulic piston and cylinder arrangement therebelow and connected thereto to exert a lifting force on the plate 40 to extend the plate 40 upward through the platform P-1.

Broadly, this invention relates to loading devices and associated platforms whereby objects may be loaded onto and removed from the platform.

What is claimed is:
1. A pipe handling mechanism comprising:
 (a) a platform having two or more openings between the two sides thereof,
 (b) a pipe rack adjacent one side of the platform,
 (c) pivot means beneath the openings in the platform with one end of the pivot means nearer the pipe rack than another end,
 (d) first plate means connected to the pivot means and having an angular surface opposite the pivot means which slopes away from the pipe rack,
 (e) means for shifting pipe on the rack toward the adjacent platform,
 (f) second plate means connected to the pivot means beneath the pipe rack, said second plate means having an angular surface sloping toward the pipe rack, and
 (g) means for rotating the pivot means to engage the first plate means with pipe on the platform.

2. A pipe handling mechanism comprising:
 (a) a platform having two or more openings between the two sides thereof,
 (b) a pipe rack adjacent one side of the platform,
 (c) pivot means beneath the openings in the platform with one end of the pivot means nearer the pipe rack than another end, (d) first plate means connected to the pivot means and having an angular surface opposite the pivot means which slopes away from the pipe rack,
(e) means for shifing pipe on the rack toward the adjacent platform,
(f) second plate means connected to the pivot means beneath the pipe rack, said second plate means having an angular surface sloping toward the pipe rack, and
(g) means for rotating the pivot means to engage the first plate means with pipe on the platform and to simultaneously engage the second plate means with pipe on the rack.

References Cited by the Examiner
UNITED STATES PATENTS

| | | |
|---|---|---|
| 2,043,556 | 6/1936 | Protin. |
| 2,763,236 | 9/1956 | Cummings. |
| 2,870,899 | 1/1959 | Dillingham _____ 198—127 XR |
| 2,880,844 | 4/1959 | Vogeli. |

FOREIGN PATENTS 1,211,064   10/1959   France.

MARVIN A. CHAMPION, *Primary Examiner.*